(12) United States Patent
Choi et al.

(10) Patent No.: US 11,926,882 B1
(45) Date of Patent: Mar. 12, 2024

(54) METHOD FOR PRODUCING AQUEOUS SOLUTION CONTAINING NICKEL OR COBALT

(71) Applicants: KOREA ZINC CO., LTD., Seoul (KR); KEMCO, Seoul (KR)

(72) Inventors: Heon Sik Choi, Ulsan (KR); Jae Hoon Joo, Ulsan (KR); Chang Young Choi, Seoul (KR)

(73) Assignees: KOREA ZINC CO., LTD., Seoul (KR); KEMCO, Seoul (KR)

( * ) Notice: Subject to any disclaimer, the term of this patent is extended or adjusted under 35 U.S.C. 154(b) by 0 days.

(21) Appl. No.: 18/547,565

(22) PCT Filed: Mar. 28, 2023

(86) PCT No.: PCT/KR2023/004100
§ 371 (c)(1),
(2) Date: Aug. 23, 2023

(87) PCT Pub. No.: WO2023/243827
PCT Pub. Date: Dec. 21, 2023

(30) Foreign Application Priority Data

Jan. 27, 2023 (KR) .......................... 10-2023-0010613

(51) Int. Cl.
*C22B 3/00* (2006.01)
*C22B 3/08* (2006.01)
(Continued)

(52) U.S. Cl.
CPC ............ *C22B 23/0461* (2013.01); *C22B 3/08* (2013.01); *C22B 3/22* (2013.01); *C22B 3/42* (2013.01);
(Continued)

(58) Field of Classification Search
CPC ......... C22B 23/0461; C22B 3/08; C22B 3/22; C22B 3/42; C22B 15/0071; C22B 23/0407
(Continued)

(56) References Cited

U.S. PATENT DOCUMENTS

2011/0056333 A1    3/2011   Liu et al.

FOREIGN PATENT DOCUMENTS

| CA | 2229232 C | * | 2/2010 | .......... C22B 23/043 |
| CN | 109097581 | | 12/2018 | |

(Continued)

*Primary Examiner* — Brian D Walck
*Assistant Examiner* — Danielle Carda
(74) *Attorney, Agent, or Firm* — HAMRE, SCHUMANN, MUELLER & LARSON, P.C.

(57) ABSTRACT

A method for producing an aqueous solution containing nickel or cobalt includes: (A) a leaching step, which includes a first atmospheric pressure heating leaching step and a second atmospheric pressure heating leaching step, in which a raw material is heated and leached under an atmospheric pressure to form a leachate solution containing nickel, cobalt, and impurities; (B) a first extraction step of separating the leachate solution into a first filtrate containing nickel and impurities and a first organic layer containing cobalt and impurities by adding a first solvent extractant to the leachate solution; (C-i) a precipitation removal step of precipitating and removing impurities including magnesium, calcium, or a mixture thereof by adding a precipitating agent to the first filtrate; and (D-i) a target material precipitation step of selectively precipitating a nickel cake containing nickel by adding a neutralizing agent to the first filtrate.

22 Claims, 3 Drawing Sheets

(51) Int. Cl.
    *C22B 3/22*     (2006.01)
    *C22B 3/42*     (2006.01)
    *C22B 15/00*    (2006.01)

(52) U.S. Cl.
    CPC ...... *C22B 15/0071* (2013.01); *C22B 23/0407* (2013.01)

(58) Field of Classification Search
    USPC .......................................................... 75/739
    See application file for complete search history.

(56) References Cited

FOREIGN PATENT DOCUMENTS

| | | |
|---|---|---|
| JP | S57104640 A | 6/1982 |
| KR | 10-1412462 B1 | 6/2014 |
| KR | 101535250 B1 | 7/2015 |
| KR | 101979419 B1 | 8/2019 |
| KR | 10-2021-0079709 | 6/2021 |
| KR | 102451443 B1 | 10/2022 |
| KR | 10-2471399 B1 | 11/2022 |
| WO | 2022/236381 | 11/2022 |

\* cited by examiner

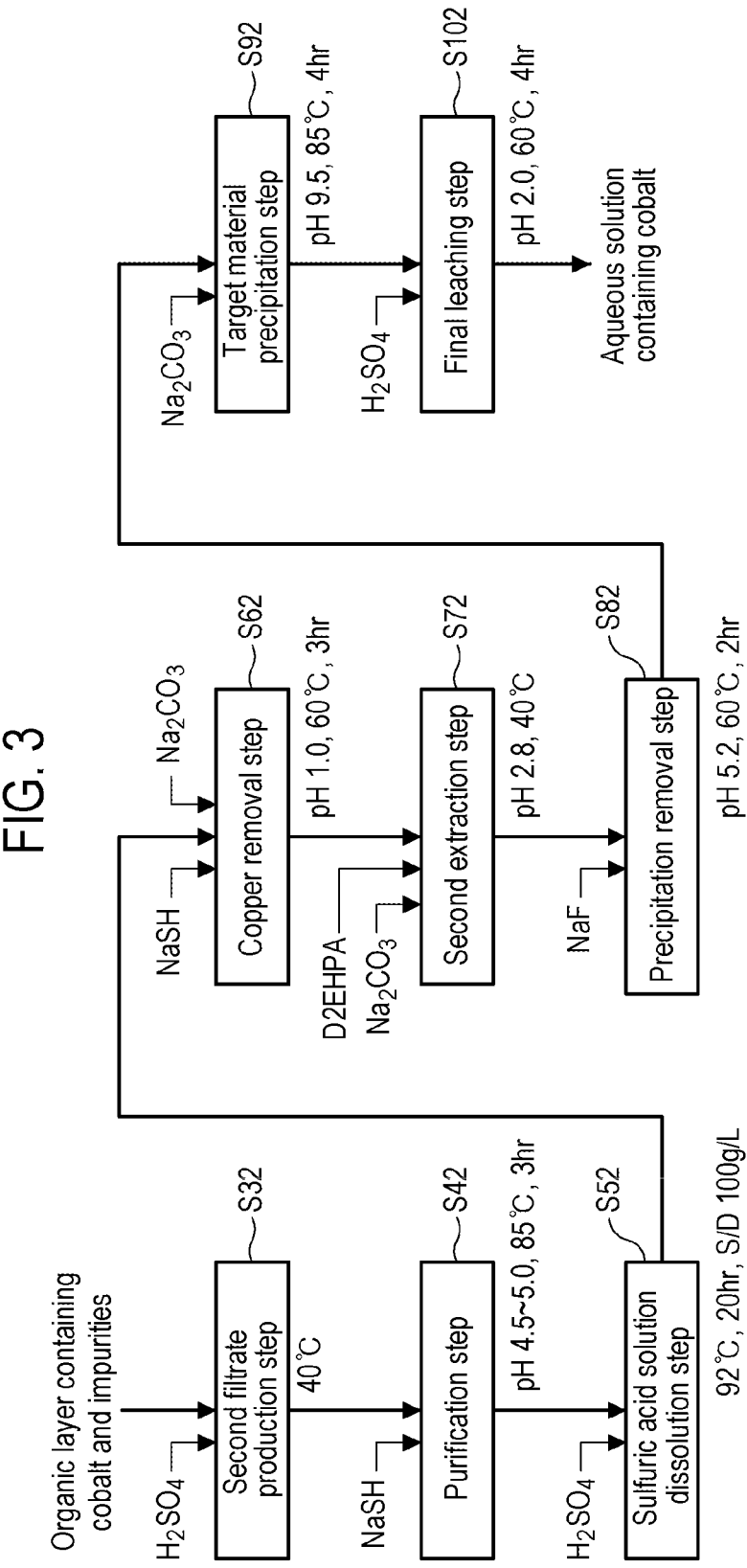

METHOD FOR PRODUCING AQUEOUS SOLUTION CONTAINING NICKEL OR COBALT

TECHNICAL FIELD

The present invention relates to a method for producing an aqueous solution containing nickel or cobalt. More specifically, the present invention relates to a method for producing an aqueous solution containing nickel or cobalt for recovering nickel and cobalt from a raw material and then producing an aqueous solution containing nickel or cobalt that can be used for producing a cathode active material of a lithium ion secondary battery.

BACKGROUND

A one-stage atmospheric pressure heating reaction leaching process, or a two-stage leaching process consisting of an atmospheric pressure heating reaction and a pressurizing heating reaction has been mainly used to ionize nickel and cobalt from a mixed hydroxide precipitate (MHP) cake raw material containing nickel/cobalt mixed hydroxide.

However, in the case of the one-stage atmospheric pressure heating reaction leaching process, a problem occurs in that the recovery rate of Ni and Co decreases. In the case of the two-stage leaching process consisting of an atmospheric pressure heating reaction and a pressurizing heating reaction, a problem is posed in that the range of material selection is reduced due to erosion, corrosion, damage, etc. of pipe and reactor materials, and the competitiveness is lowered due to energy costs.

In addition, nickel and cobalt were selectively recovered from the ionized aqueous of nickel/cobalt solution using a solvent extractant such as Ion quest 801, Cyanex 272, Versatic Acid 10, or LIX 84I. However, there is a risk of fire and explosion due to the use of an organic solvent in a solvent extraction process. The high unit price of the solvent extractant increases the cost of producing high-purity nickel sulfate and cobalt, thereby reducing competitiveness in terms of price.

SUMMARY

An object of the present invention is to produce a high-purity aqueous solution by recovering nickel and cobalt from an MHP cake raw material containing nickel/cobalt mixed hydroxide.

In addition, it is an object of the present invention to improve a nickel/cobalt recovery rate and reduce energy consumption by ionizing nickel and cobalt using a two-stage atmospheric pressure heating leaching step.

In addition, it is an object of the present invention to separate magnesium and calcium using sodium fluoride (NaF) as a precipitant in an aqueous solution containing high-purity nickel production step, separate magnesium and manganese through a solubility difference using sodium hydrogen sulfide (NaSH) in an aqueous solution containing high-purity cobalt production step, and additionally separate impurities such as copper, magnesium, and manganese through the use of sodium hydrogen sulfide (NaSH) and sodium fluoride (NaF), thereby reducing the solvent extraction step.

Since the solvent extraction step has a risk of fire and explosion due to the use of an organic solvent, it is an object of the present invention to minimize the solvent extraction step, thereby improving the operating environment and reducing the production cost of a final product.

According to one aspect of the present invention, there is provided a method for producing an aqueous solution containing nickel or cobalt, including: (A) a leaching step, which includes a first atmospheric pressure heating leaching step and a second atmospheric pressure heating leaching step, in which a raw material is heated and leached under an atmospheric pressure to form a leachate solution containing nickel, cobalt, and impurities; (B) a first extraction step of separating the leachate solution into a first filtrate containing nickel and impurities and a first organic layer containing cobalt and impurities by adding a first solvent extractant to the leachate solution; (C-i) a precipitation removal step of precipitating and removing impurities including magnesium, calcium, or a mixture thereof by adding a precipitating agent to the first filtrate; and (D-i) a target material precipitation step of selectively precipitating a nickel cake containing nickel by adding a neutralizing agent to the first filtrate from which the impurities are precipitated and removed.

According to another aspect of the present invention, there is provided a method for producing an aqueous solution containing nickel or cobalt, including: (A) a leaching step, which includes a first atmospheric pressure heating leaching step and a second atmospheric pressure heating leaching step, in which a raw material is heated and leached under an atmospheric pressure to form a leachate solution containing nickel, cobalt, and impurities; (B) a first extraction step of separating the leachate solution into a first filtrate containing nickel and impurities and a first organic layer containing cobalt and impurities by adding a first solvent extractant to the leachate solution; and (C-ii) a purification step of removing impurities including magnesium, manganese, zinc, copper, or mixtures thereof by adding a sulfuric acid solution to the first organic layer to produce a second filtrate, and adding sulfide to the second filtrate to precipitate and recover a cobalt precipitate.

In an embodiment of the present invention, a pH of the filtrate obtained in the second atmospheric pressure heating leaching step may be lower than a pH of the filtrate obtained in the first atmospheric pressure heating leaching step.

In an embodiment of the present invention, the filtrate obtained in the second atmospheric pressure heating leaching step may be fed to the first atmospheric pressure heating leaching step.

In an embodiment of the present invention, the first solvent extractant may be bis (2,4,4-trimethylpentyl) phosphinic acid.

In an embodiment of the present invention, the first extraction step may be carried out at a temperature of 40 degrees C. and a pH of greater than 5.0 and less than 5.4.

In an embodiment of the present invention, the precipitating agent may be sodium fluoride.

In an embodiment of the present invention, the precipitating agent may be added in an amount of more than 2.0 equivalents and less than 2.4 equivalents of an amount of the magnesium, calcium, or a mixture thereof.

In an embodiment of the present invention, the neutralizing agent may be a basic material containing sodium.

In an embodiment of the present invention, after the neutralizing agent is added, the pH of the first filtrate may be 8 or more at a temperature of 85 degrees C.

In an embodiment of the present invention, the method may further include: (E-i) a washing step of washing the nickel cake with pure water.

In an embodiment of the present invention, the sulfide may be sodium hydrogen sulfide (NaSH).

In an embodiment of the present invention, the sulfide may be added in an amount of more than 1.0 equivalents and less than 1.6 equivalents of an amount of the cobalt and zinc.

In an embodiment of the present invention, the method may further include: (D-ii) a copper removal step of dissolving the cobalt precipitate in a sulfuric acid solution and then removing copper.

In an embodiment of the present invention, the copper removal step may be performed by adding sodium hydrogen sulfide (NaSH) in an amount greater than 4.5 equivalents and less than 5.5 equivalents of copper content.

In an embodiment of the present invention, the method may further include: (E-ii) a second extraction step of separating the copper-removed aqueous solution into a third filtrate containing cobalt and impurities and a second organic layer containing zinc and impurities by adding a second solvent extractant to the copper-removed aqueous solution.

In an embodiment of the present invention, the second solvent extractant may be D2EHPA (di-(2-ethylhexyl) phosphoric acid).

In an embodiment of the present invention, the second extraction step may be carried out at a pH of greater than 2.4 and less than 3.2 at a temperature of 40 degrees C.

In an embodiment of the present invention, the method may further include: (F) a precipitation removal step of precipitating and removing impurities including magnesium by adding a precipitating agent to the third filtrate.

In an embodiment of the present invention, the method may further include: (G) a target material precipitation step of selectively precipitating a cobalt cake containing cobalt by adding a neutralizing agent to the third filtrate from which the impurities are precipitated and removed.

In an embodiment of the present invention, after the neutralizing agent is added, the pH of the third filtrate may be 8 or more at a temperature of 85 degrees C.

In an embodiment of the present invention, the method may further include: (H) a washing step of washing the cobalt cake with pure water.

According to the present invention, it is possible to improve the nickel/cobalt recovery rate and reduce the energy consumption by using a two-stage atmospheric pressure heating step.

In addition, by minimizing the solvent extraction step having a risk of fire and explosion due to the use of an organic solvent in the impurity removal step, it is possible to improve the operating environment and reduce the production cost of a final product.

BRIEF DESCRIPTION OF THE DRAWINGS

FIG. 3 is a diagram showing an impurity removal step, a copper removal step, a second extraction step, a precipitation removal step, and a target material precipitation step for producing an aqueous solution containing cobalt according to one embodiment of the present invention.

DETAILED DESCRIPTION

Embodiments of the present disclosure are illustrated for describing the technical spirit of the present disclosure. The scope of the claims according to the present disclosure is not limited to the embodiments described below or to the detailed descriptions of these embodiments.

The present invention will now be described with reference to the drawings.

Figure 1:
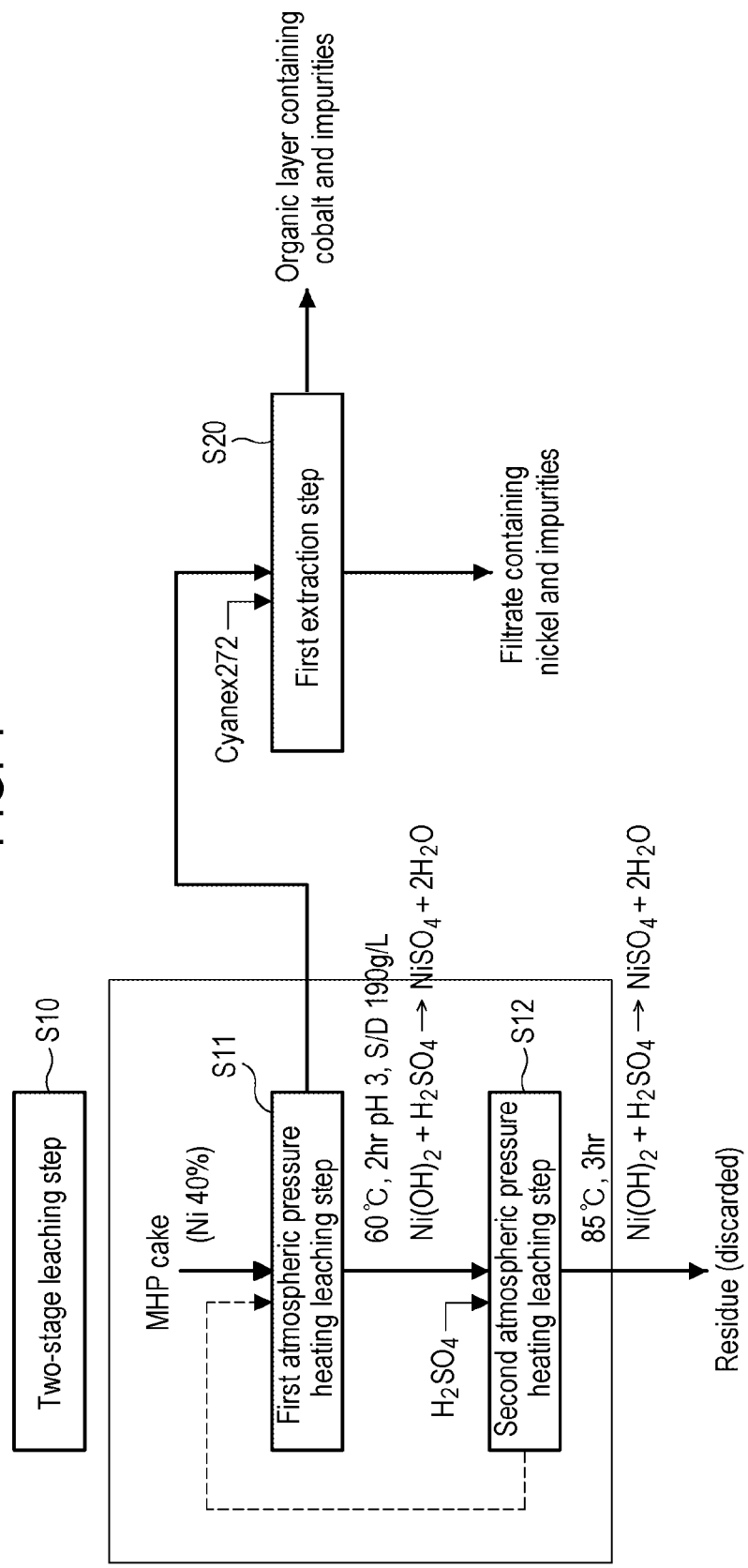
FIG. 1 is a diagram showing a two-stage leaching step and a first extraction step for producing an aqueous solution containing nickel or cobalt according to one embodiment of the present invention.
Figure 2:
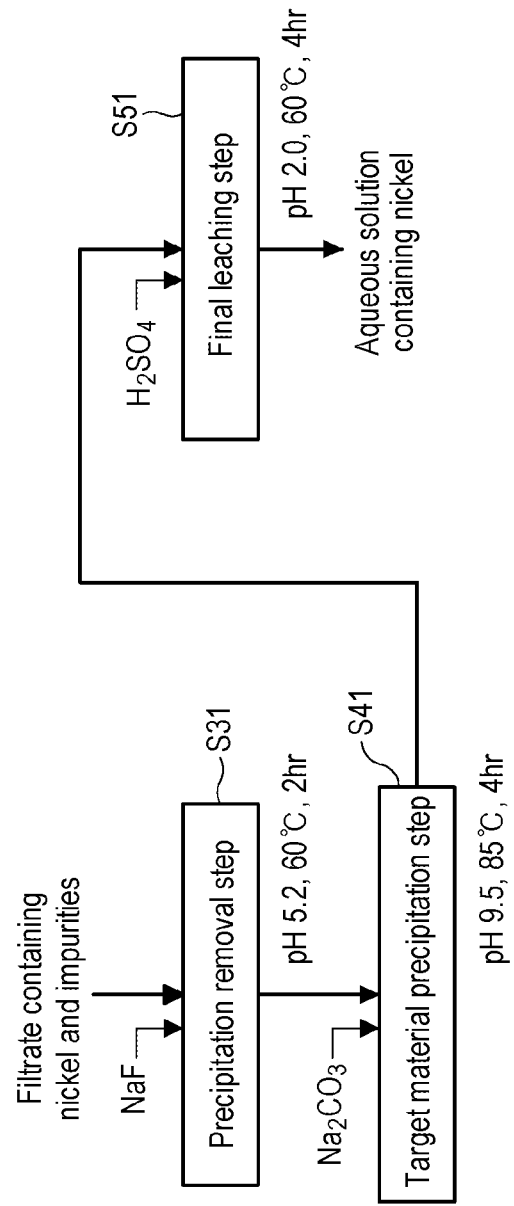
FIG. 2 is a diagram showing a precipitation removal step and a target material precipitation step for producing an aqueous solution containing nickel according to one embodiment of the present invention.

FIG. 1 is a diagram showing a two-stage leaching step S10 and a first extraction step S20 for producing an aqueous solution containing nickel or cobalt according to one embodiment of the present invention. FIG. 2 is a diagram showing a precipitation removal step S31 and a target material precipitation step S41 for producing an aqueous solution containing nickel according to one embodiment of the present invention. FIG. 3 is a diagram showing an impurity removal step S32 and S42, a copper removal step S62, a second extraction step S72, a precipitation removal step S82, and a target material precipitation step S92 for producing an aqueous solution containing cobalt according to one embodiment of the present invention.

Referring to FIGS. 1 to 3, there may be provided a method for producing an aqueous solution containing nickel or cobalt that can be used for manufacturing a cathode active material of a lithium secondary battery from a mixed hydroxide precipitate (MHP cake) through a series of steps. According to this method, it is possible to improve the operation stability and the purity, and reduce the production cost. Hereinafter, the respective steps will be described in detail with reference to the drawings.

Firstly, referring to FIG. 1, a leaching step S10 of forming a leachate by performing two-stage atmospheric pressure heating leaching steps on an MHP cake, and a first extraction step S20 of separating the leachate into a first filtrate containing nickel and impurities and a first organic layer containing cobalt and impurities may be performed.

Leaching Step S10

The leaching step S10 is a step of forming a leachate by dissolving an MHP cake in the form of hydroxide in an acid solution such as sulfuric acid to ionize the MHP cake. The leaching step S10 includes a first atmospheric pressure heating leaching step S11 and a second atmospheric pressure heating leaching step S12. The atmospheric pressure heating leaching step is a step of producing an acid solution in an open reactor at a temperature of 100 degrees C. or less, introducing a raw material into the reactor, and leaching valuable metals by a reaction represented by the following Reaction Formula 1. The raw material introduced here may be an MHP cake in the form of hydroxide containing nickel in an amount of 40% by weight.

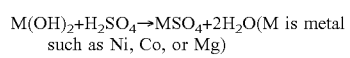

$M(OH)_2 + H_2SO_4 \rightarrow MSO_4 + 2H_2O$ (M is metal such as Ni, Co, or Mg) [Reaction Formula 1]

The first atmospheric pressure heating leaching step S11 and the second atmospheric pressure heating leaching step S12 may be separately performed in two-stage apparatuses, or may be performed in one pressurization apparatus by changing only the process conditions (e.g., temperature, pressure, or acidity).

Valuable metals may be leached from the raw material through the first atmospheric pressure heating leaching step S11. For example, valuable metals such as nickel, cobalt, and manganese in the raw material may be leached. In addition, elements such as iron, copper, aluminum, zinc, magnesium, and the like in the raw material may also be leached. The first atmospheric pressure heating leaching step S11 may be performed for about 2 hours at a temperature in the range of 50 degrees C. to 70 degrees C. and a pH in the range of 2.7 to 3.3. By satisfying the temperature and the pH, high leaching efficiency can be obtained under optimal conditions.

In the first atmospheric pressure heating leaching step S11, the solid density of the raw material introduced into the reactor may be 100 g/L or more. For example, the solid density of the raw material may be in the range of 100 g/L to 200 g/L. As used herein, the term "solid density" is defined as the ratio of the mass of the raw material introduced into the pressurization apparatus to the volume of the acid solution previously introduced into the reactor. In other words, the solid density may be the ratio of the mass of the raw material introduced per unit solvent, and may be the mass of the raw material per 1 L of a solvent.

The filtrate obtained in the first atmospheric pressure heating leaching step S11 may be introduced into the first extraction step S20, and the residue may be subsequently treated in the second atmospheric pressure heating leaching step S12.

In the second atmospheric pressure heating leaching step S12, the leaching residue obtained in the first atmospheric pressure heating leaching step S11 may be leached at a temperature in the range of 80 degrees C. to 100 degrees C. for about 3 hours. Other conditions of the second atmospheric pressure heating leaching step S12 may be the same as those of the first atmospheric pressure heating leaching step S11.

The pH of the filtrate obtained in the second atmospheric pressure heating leaching step S12 may be lower than the pH of the filtrate obtained in the first atmospheric pressure heating leaching step S1$i$. By controlling the pH, the leaching rate in each atmospheric pressure heating leaching step can be increased. Accordingly, the entire amount of the valuable metals contained in the raw material can be leached out. For example, the entire amounts of nickel, cobalt, manganese, iron, copper, aluminum, zinc, and magnesium contained in the raw material can be leached out.

In one embodiment, the filtrate formed in the second atmospheric pressure heating leaching step S12 may be fed to the first atmospheric pressure heating leaching step S11 as shown in FIG. 1.

In the case of a commonly used atmospheric pressure leaching method, the reaction time has to be continued for 18 hours or longer to increase the leaching rate of valuable metals. In this case, additional costs are incurred due to the increased use of fuel and steam. The productivity is low because the amount of raw material processed per day is small. However, according to one embodiment of the present invention, by using the two-stage atmospheric pressure heating leaching method, it is possible to improve the recovery rate of nickel and cobalt and reduce the energy consumption. Thus, it is possible to reduce the production cost and improve the productivity.

The residue generated in the second atmospheric pressure heating leaching step S12 may be discarded as shown in FIG. 1.

First Extraction Step S20

The first extraction step S20 is a step of selectively separating or extracting nickel from the aqueous solution containing nickel/cobalt (leachate solution) ionized through the two-stage atmospheric pressure heating leaching step by using a first solvent extractant.

In this regard, the first solvent extractant is not particularly limited as long as the loading rate of nickel is low, and may be, for example, bis(2,4,4-trimethylpentyl) phosphinic acid (Cyanex272).

When the first solvent extractant is added to the leachate, nickel may be not loaded into the first solvent extractant and may be distributed to the first filtrate (Raffinate). Cobalt and other impurities (Mg, Mn, Zn, etc.) may be separated or extracted by being distributed to an organic layer together with the first solvent extractant. This separation or extraction can occur according to the reactions represented by Reaction Formulae 2 and 3 below. In this regard, the reaction of Reaction Formula 3 is a reaction for maintaining the pH by neutralizing $H_2SO_4$ formed by the reaction of Reaction Formula 2.

$2HR(org.)+MSO_4(aq.) \rightarrow MR_2(org.)+H_2SO_4(aq.)$ (R is Ni etc., and M is Co, Mg, Mn etc.) [Reaction Formula 2]

$H_2SO_4+Na_2CO_3 \rightarrow Na_2SO_4+H_2O+CO_2$ [Reaction Formula 3]

The first extraction step may be performed at a temperature of 40 degrees C. and a pH of greater than 5.0 and less than 5.4. By satisfying the temperature and the pH, it is possible to increase the loading rate of cobalt and impurities, and efficiently separate nickel into the filtrate.

In one embodiment, the ratio of the first solvent extractant (O) to the aqueous solution (A) can be controlled according to the concentration of the component to be extracted from the solution. For example, the ratio (O:A) of the first solvent extractant (O) to the aqueous solution (A) may range from 0.5:1 to 2:1. For example, the O:A may be 1.5:1.

Referring next to FIG. 2, a precipitation removal step S31 of precipitating and removing impurities from the first filtrate that has passed through the first extraction step S11, a target material precipitation step S41 of selectively precipitating a nickel cake containing high-purity nickel, and a final leaching step of producing an aqueous solution containing high-purity nickel may be performed.

Precipitation Removal Step S31

The precipitation removal step S31 may be performed to remove impurities such as magnesium, calcium, or a mixture thereof remaining in the first filtrate. After the precipitation removal step S31, the first filtrate may be fed to the target material precipitation step S41.

For example, in the precipitation removal step S31, a removing agent may be introduced into the solution. The removing agent is not particularly limited as long as it can react with magnesium or calcium to form a precipitate. The removing agent may be, for example, sodium fluoride (NaF).

For example, magnesium and calcium may be precipitated as magnesium fluoride or calcium fluoride through a reaction represented by Reaction Formula 4 below.

For example, by performing the precipitation removal step S31 for about 2 hours or more at a reaction temperature in the range of 50 degrees C. to 70 degrees C., only magnesium and calcium can be separated through selective precipitation while reducing nickel precipitation in the filtrate.

$MSO_4+2NaF=MF_2+Na_2SO_4$ (M is Mg or Ca) [Reaction Formula 4]

In one embodiment, sodium fluoride may be added in an amount greater than 2.0 equivalents (eq) of magnesium, calcium or a mixture thereof. In another embodiment, sodium fluoride may be added in an amount less than 2.4 equivalents (eq) of magnesium, calcium or a mixture thereof.

Target Material Precipitation Step S41

In the target material precipitation step S41, a neutralizing agent may be added to the first filtrate after the precipitation removal step S31.

For example, the neutralizing agent may be a basic material containing sodium. For example, the neutralizing agent may be sodium carbonate ($Na_2CO_3$).

After removing impurities such as magnesium and calcium, in the target material precipitation step S41, nickel may be precipitated in the form of a cake through a reaction indicated by Reaction Formula 5 below.

$$3NiSO_4 + 3Na_2CO_3 + 2H_2O = NiCO_3 \cdot 2Ni(OH)_2 + 3Na_2SO_4 + 3CO_2 \quad \text{[Reaction Formula 5]}$$

The target material precipitation step S41 may be performed for 4 hours or more at a pH of 8 or higher and a temperature in the range of 80 degrees C. to 90 degrees C.

Since nickel can be recovered through the target material precipitation step S41, it is possible to reduce the use of expensive organic solvents that have a risk of explosion and fire. Thus, it is possible to improve the operational stability and the productivity, and reduce the production costs.

Although not specifically shown in the drawings, some sodium components may be present in the precipitated nickel cake. Therefore, the water-soluble sodium components can be removed by a washing step using pure water at the rear stage. In this case, the production cost can be reduced by reusing the removed sodium components in producing sodium carbonate ($Na_2CO_3$), which is a neutralizing agent.

Final Leaching Step S51

The final leaching step S51 is a step of producing an aqueous solution containing high-purity nickel by removing components such as sodium and the like through washing and dissolving the nickel cake in a sulfuric acid solution.

In the final leaching step S51, the nickel cake may be added to a solution obtained by mixing pure water with sulfuric acid at an acidity of 150 g/L to 200 g/L. Nickel, cobalt, and trace impurities contained in the nickel cake can be dissolved in the sulfuric acid solution. The sulfuric acid solution and the nickel cake are reacted until the pH becomes 2.0. According to one embodiment, in the final leaching step S51, the reaction may be performed for 4 hours or more at a pH in the range of 1.0 to 3.0 and a temperature in the range of 50 degrees C. to 70 degrees C.

Referring next to FIG. 3, a second filtrate production step S32 of adding a sulfuric acid solution to the first organic layer that has passed through the first extraction step S11, a purification step S42 of precipitating and recovering a cobalt precipitate from the second filtrate and purifying impurities, a step S52 of dissolving the cobalt precipitate in the sulfuric acid solution again, a copper removal step S62 of removing copper by adding sodium hydrogen sulfide, a second extraction step S72 of separating the aqueous solution from which copper is removed into a third filtrate containing cobalt and impurities and a second organic layer containing zinc and impurities, a precipitation removal step S82 of precipitating and removing impurities from the third filtrate, a target material precipitation step S92 of selectively precipitating a cobalt cake containing high-purity cobalt, and a final leaching step of producing an aqueous solution containing high-purity cobalt S102 may be performed.

Second Filtrate Production Step S32

The second filtrate production step S32 is a step of stripping cobalt into the sulfuric acid solution by adding a sulfuric acid solution to the first organic layer containing cobalt and impurities.

Stripping is a process in which a stripping filtrate containing cobalt is produced by reacting sulfuric acid with loaded cobalt, and loaded impurities are recovered with an aqueous solution.

Purification Step S42

The purification step S42 is a step of selectively recovering only cobalt from the stripped second filtrate. What is different from the precipitation removal step S31 is that in the refining step S32, cobalt, which is the target material, may be recovered in the form of a precipitate.

For example, in the purification step S42, a cobalt precipitate may be generated by adding sulfide into the solution. For example, the sulfide may be sodium hydrogen sulfide (NaSH). Cobalt may be precipitated and recovered in the form of sulfide by the reactions represented by the following Reaction Formulae 6 and 7.

$$CoSO_4 + 2NaSH \rightarrow 2\,CoS + Na_2SO_4 + H_2SO_4 \quad \text{[Reaction Formula 6]}$$

$$H_2SO_4 + Na_2CO_3 \rightarrow Na_2SO_4 + H_2O + CO_2 \quad \text{[Reaction Formula 7]}$$

For example, while maintaining a pH of 4.5 to 5.0 at a reaction temperature in the range of 70 degrees C. to 90 degrees C., the purification step S42 may be performed for about 3 hours or more.

In the above pH range, the solubility of CoS and ZnS is very low, 0.1 mg/L or less, and the solubility of MgS and MnS is very low. Therefore, only cobalt and zinc can be separated through selective precipitation by controlling the pH range, thereby purifying magnesium and manganese.

In one embodiment, sulfide may be added in an amount greater than 1.0 equivalents and less than 1.6 equivalents of an amount of the cobalt and zinc.

Sulfuric Acid Solution Production Step S52

In the sulfuric acid solution production step S52, an aqueous solution is produced by dissolving a precipitate containing cobalt in a sulfuric acid solution.

For example, the sulfuric acid solution production step S52 may be performed by a reaction represented by the following Reaction Formula 8.

$$CoS + H_2SO_4 + \tfrac{1}{2}O_2 \rightarrow CoSO_4 + H_2O + S \quad \text{[Reaction Formula 8]}$$

For example, in the sulfuric acid solution production step S52, the solid density (S/D) of the precipitate in the sulfuric acid solution during the production of the aqueous solution may be 100 g/L or more.

For example, the sulfuric acid solution production step S52 may be performed at a reaction temperature in the range of 80 degrees C. to 100 degrees C. for about 20 hours or more.

Copper Removal Step S62

The copper removal step S62 is a step of removing copper (Cu) from the solution by adding sodium hydrogen sulfide (NaSH) to the solution. Copper may be precipitated as a copper sulfide (CuS) compound through a reaction indicated by the following Reaction Formula 9.

$$2CuSO_4 + 2NaSH = 2CuS + Na_2SO_4 + H_2SO_4 \quad \text{[Reaction Formula 9]}$$

Copper sulfide (CuS) can be precipitated at a pH of 1.0 or more. To this end, in the copper removal step S62, the pH of the solution may be maintained at 1.0 to 2.5. In one embodiment, the pH of the solution in the copper removal step S62 may be maintained at 1.0 to 1.5. When the pH in the solution is less than 1.0, it is difficult to remove copper from the solution at 20 mg/L or less. When the pH is greater than 2.5, the solubility of cobalt in sulfuric acid is lowered, and cobalt may be lost.

On the other hand, sodium hydrogen sulfide (NaSH) may be added slowly so that the pH in the solution does not change rapidly. For example, sodium hydrogen sulfide (NaSH) may be added over about 3 hours while stirring the leachate. Accordingly, it is possible to prevent an increase in the cobalt loss rate due to a rapid increase in pH in some regions of the solution.

In one embodiment, sodium hydrogen sulfide (NaSH) may be added in an amount greater than 4.5 equivalents (eq) and less than 5.5 equivalents (eq) of copper content. When the addition amount of sodium hydrogen sulfide (NaSH) is 4.5 equivalents (eq) or less, it is difficult to sufficiently remove copper from the solution because the copper removal rate is 95% or less. When the addition amount of sodium hydrogen sulfide (NaSH) is 5.5 equivalents (eq) or more, the cobalt recovery rate may decrease because the cobalt removal rate is 0.05% or more.

By performing the copper removal step S62 for 3 hours or more at a reaction temperature in the range of 50 degrees C. to 70 degrees C., it is possible to reduce cobalt precipitation in the filtrate and separate only copper through selective precipitation. Sodium hydrogen sulfide may be a product having a concentration of 30 wt % to 70 wt %.

Second Extraction Step S72

The second extraction step S72 is a step of adding a second solvent extractant to the solution and separating the solution into a third filtrate containing cobalt and impurities and a second organic layer containing zinc and impurities.

In this regard, the second solvent extractant is not particularly limited as long as the cobalt loading rate thereof is low. For example, the second solvent extractant may be D2EHPA (di-(2-ethylhexyl)phosphoric acid).

When the second solvent extractant is added to the solution, cobalt may be not loaded into the second solvent extractant and may be distributed to the third filtrate (Raffinate), and zinc, magnesium, manganese, etc. are distributed and separated or extracted to the organic layer together with the second solvent extractant. This separation or extraction may occur through a reaction represented by the following Reaction Formula 10.

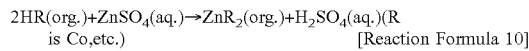
[Reaction Formula 10]

The second extraction step S72 may be performed for about 10 minutes or longer at a pH of greater than 2.4 and less than 3.2 and a temperature of 40 degrees C. By satisfying the pH range under the temperature condition, it is possible to increase the loading rate of impurities such as zinc and the like, lower the loading rate of cobalt, and efficiently separate cobalt into the filtrate.

In one embodiment, the ratio of the second solvent extractant (0) to the aqueous solution (A) can be controlled according to the concentration of the component to be extracted in the solution. For example, the ratio (O:A) of the second solvent extractant (0) to the aqueous solution (A) may range from 0.5:1 to 2:1. For example, the O:A can be 1.5:1.

Precipitation Removal Step S82

The precipitation removal step S82 may be performed to remove impurities such as magnesium and the like remaining in the third filtrate. After the precipitation removal step S82, the third filtrate may be fed to the target material precipitation step S92.

Details of the precipitation removal step S82 may be understood by referring to the description of the precipitation removal step S31.

Target Material Precipitation Step S92

In the target material precipitation step S92, a neutralizing agent may be added to the third filtrate after the precipitation removal step S82.

For example, the neutralizing agent may be a basic material containing sodium. For example, the neutralizing agent may be sodium carbonate ($Na_2CO_3$).

After removing impurities such as magnesium and the like, nickel may be precipitated in the form of a cake through a reaction represented by the following Reaction Formula 11 in the target material precipitation step S41.

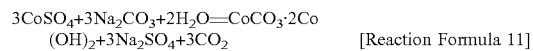
[Reaction Formula 11]

The target material precipitation step S92 may be performed for 4 hours or more at a pH of 8 or higher and a temperature in the range of 80 degrees C. to 90 degrees C.

Since cobalt can be recovered through the target material precipitation step S92, it is possible to reduce the use of expensive organic solvents that have a risk of explosion and fire. Thus, it is possible to improve the operational stability and the productivity, and reduce the production costs.

Although not specifically shown in the drawings, some sodium components may be present in the precipitated cobalt cake. Therefore, the water-soluble sodium components can be removed by a washing step using pure water at the rear stage. In this case, the production cost can be reduced by reusing the removed sodium components in producing sodium carbonate ($Na_2CO_3$), which is a neutralizing agent.

Final Leaching Step S102

The final leaching step S102 is a step of producing an aqueous solution containing high-purity cobalt by removing components such as sodium and the like through washing and dissolving the cobalt cake in a sulfuric acid solution.

Details of the final leaching step S102 may be understood by referring to the above description of the final leaching step S51.

Experimental Example (1) Quality of the MHP Cake Raw Material Used in the Experiment

TABLE 1

| | Ni | Co | Mg | Mn | Zn |
|---|---|---|---|---|---|
| Content (wt %) | 38.0 | 3.80 | 1.40 | 6.15 | 0.90 |

* The content not shown in the table is impurities (mostly present with hydroxyl groups attached thereto) (2) Metal content in the leaching filtrate after the leaching step including the two-stage atmospheric pressure heating leaching step

TABLE 2

| | Ni | Co | Mg | Mn | Zn |
|---|---|---|---|---|---|
| Content (g/L) | 100.1 | 10.3 | 5.11 | 9.87 | 2.33 |

Comparing Tables 1 and 2, it can be seen that the nickel and cobalt contents in the leaching filtrate subjected to the two-stage atmospheric pressure heating leaching step are increased. (3) Comparison of cobalt contents in the organic layer according to the pH conditions in the extraction step Loading rates of the respective components in the organic layer at pH 5.0, 5.2, and 5.4 were compared in order to examine the optimal pH conditions for separating nickel into an aqueous filtrate (Raffinate) by loading cobalt and impurities (Mg, Mn, Zn, etc.) into the organic layer using 30% Cyanex272. The reaction was carried out at 40 degrees C.

for 10 minutes, and the ratio of the organic layer to the aqueous solution was 1.5:1. The loading rate was expressed as a relative ratio of the content of each component present in the organic layer based on the content of each component present in the leachate.

TABLE 3

|  | Ni | Co | Mg | Mn | Zr |
|---|---|---|---|---|---|
|  | | | pH 5.0 | | |
| Loading rate (%) | 1.18 | 94.8 | 68.2 | 96.3 | 99.9 |
|  | | | pH 5.2 | | |
| Loading rate (%) | 1.20 | 97.5 | 70.0 | 99.0 | 99.9 |
|  | | | pH 5.4 | | |
| Loading rate (%) | 1.55 | 97.8 | 70.5 | 99.2 | 99.9 |

Referring to Table 3, it can be seen that the difference between the contents of Co and Ni loaded in the organic layer is largest at pH 5.2, and the separation of Co and Ni occurs best at the pH of 5.2.

In the case of pH 5.0, the content of Ni loaded in the organic layer was small, but the Co loading was relatively poor. In the case of pH 5.4, the Co loading was excellent, but the separation of Ni was relatively poor.

(4) Comparison of the Content of Impurities (Mg and Ca) in the Filtrate According to the Addition Amount of Sodium Fluoride in the Precipitation Removal Step In order to examine the optimal addition amount of sodium fluoride (NaF) for precipitating and removing impurities (Mg and Ca) in the filtrate, the sodium fluoride (NaF) was added at 2.0, 2.2, and 2.4 equivalents of Mg and Ca contents in the filtrate. The contents of impurities (Mg and Ca) in the filtrate were compared. The reaction was carried out for 2 hours at a temperature of 60 degrees C.

TABLE 4

|  |  | 2.0 Equivalent Added | | 2.2 Equivalent Added | | 2.4 Equivalent Added | |
|---|---|---|---|---|---|---|---|
|  | Filtrate | Mg | Ca | Mg | Ca | Mg | Ca |
| Content | mg/L | 1,024 | 184 | 252.2 | 68.2 | 204.8 | 55.1 | 205.0 | 54.9 |

Referring to Table 4, it can be seen that the sum of the contents of Mg and Ca in the filtrate is smallest when sodium fluoride (NaF) is added at 2.2 equivalents. (5) Comparison of metal contents (Co, Cu, Zn, Mn, and Mg) in the cobalt cake according to the addition amount of sodium hydrogen sulfide (NaSH) in the impurity removal step In order to examine the optimal conditions for stripping cobalt loaded by Cyanex272 in the organic layer with a sulfuric acid solution and then precipitating and recovering cobalt in the form of sulfide using sodium hydrogen sulfide (NaSH), the sodium hydrogen sulfide (NaSH) was added at 1.0, 1.3, and 1.6 equivalents of cobalt and zinc contents, and the precipitated cake contents were compared. The reaction was carried out for 3 hours at a temperature of 85 degrees C. and a pH of 4.5 to 5.0.

TABLE 5

|  | Co | Cu | Zn | Mn | Mg |
|---|---|---|---|---|---|
|  | | 1.0 Equivalent Added | | | |
| Content (%) | 35.2 | 0.08 | 7.76 | 2.82 | 0.12 |
|  | | 1.3 Equivalent Added | | | |
| Content (%) | 37.0 | 0.04 | 8.76 | 2.59 | 0.05 |
|  | | 1.6 Equivalent Added | | | |
| Content (%) | 37.0 | 0.05 | 8.72 | 2.52 | 0.03 |

Referring to Table 5, it can be seen that the cobalt content in the cake is high when NaSH is added at 1.3 equivalents, and the cobalt content does not increase any more even when NaSH is added in excess of 1.3 equivalents.

(6) Comparison of Copper Removal Rates According to the Addition Amount of Sodium Hydrogen Sulfide (NaSH) in the Copper Removal Step In order to examine the optimal conditions for precipitating and removing copper in the form of CuS by adding NaSH to the aqueous solution containing cobalt after dissolving the cobalt precipitate in a sulfuric acid solution, NaSH was added at 4.5, 5.0, and 5.5 equivalents of the copper content, and the removal rates of copper were compared. The reaction was carried out for 3 hours at a temperature of 60 degrees C. and a pH of 1.0. The removal rates were indicated by comparing the contents of respective components present in the aqueous solution before and after adding NaSH.

TABLE 6

|  | Co | Cu | Zn | Mn | Mg |
|---|---|---|---|---|---|
|  | | 4.5 Equivalent Added | | | |
| Removal rate (%) | 0.04 | 94.2 | 0.03 | 1.00 | 1.92 |
|  | | 5.0 Equivalent Added | | | |
| Removal rate (%) | 0.04 | 96.5 | 0.01 | 1.01 | 2.00 |
|  | | 5.5 Equivalent Added | | | |
| Removal rate (%) | 0.05 | 96.3 | 0.02 | 1.08 | 2.21 |

Referring to Table 6, it can be seen that the removal rate of Cu is highest when NaSH is added at 5.0 equivalents.

(7) Comparison of Cobalt Contents in the Organic Layer According to pH Conditions in the Extraction Step In order to examine the optimal pH conditions for loading zinc in the aqueous solution into the organic layer and separating zinc by using 30% D2EHPA as a solvent extractant for the aqueous solution containing cobalt from which cobalt has been precipitated and removed, the loading rates of the respective components at pHs of 2.4, 2.8, and 3.2 were compared. The reaction was carried out at a temperature of 40 degrees C. for 10 minutes. The ratio of the organic layer to the aqueous solution was 1.5:1.

TABLE 7

| | Co | Zn | Mn | Mg |
|---|---|---|---|---|
| | | pH 2.4 | | |
| Loading rate (%) | 0.02 | 99.6 | 68.2 | 30.8 |
| | | pH 2.8 | | |
| Loading rate (%) | 0.10 | 100 | 75.0 | 40.0 |
| | | pH 3.2 | | |
| Loading rate (%) | 0.38 | 100 | 80.2 | 43.3 |

Referring to Table 7, it can be seen that the difference between the contents of Zn and Co loaded in the organic layer is largest under the pH 2.8 condition, and the separation of Co and Zn occurs best under the pH 2.8 condition.

In the case of pH 2.4, the content of Co loaded in the organic layer was small, but the Zn loading was relatively poor. In the case of pH 3.2, the Zn loading was excellent, but the separation of Co was relatively poor.

(8) Metal Contents in the Aqueous Solution Containing Nickel/Cobalt that have Undergone the Final Washing Step to Remove Impurities

TABLE 8

Metal Content in Final Aqueous Solution Containing Nickel After Impurity Removal

| | Ni(g/L) | Co | Mg | Mn | Zn |
|---|---|---|---|---|---|
| Content (mg/L) | 131.3 | 17.9 | 18.9 | 2.87 | 2.88 |

TABLE 9

Metal Content in Final Aqueous Solution Containing Cobalt After Impurity Removal

| | Co(g/L) | Cu | Zn | Mn | Mg |
|---|---|---|---|---|---|
| Content (mg/L) | 110.6 | 3.63 | 3.38 | 12.0 | 11.4 |

Comparing Table 2 and Tables 8 and 9 together, it can be confirmed that the purity of the aqueous solution containing nickel/cobalt subjected to the steps of the present invention is increased. Although the embodiments of the present disclosure have been described with reference to the accompanying drawings, those skilled in the art to which the present disclosure pertains will be able to understand that the embodiments can be implemented in other specific forms without changing the technical spirit or essential features of the present disclosure.

Therefore, it should be understood that the embodiments described above are exemplary and not limitative in all respects. The scope of the present disclosure is defined by the claims rather than the detailed description. It should be construed that all changes or modified forms derived from the meaning and scope of the claims and equivalent concepts thereof are included in the scope of the present disclosure.

What is claimed is:

1. A method for producing an aqueous solution containing nickel or cobalt comprising:
   (A) a leaching step, which includes a first atmospheric pressure heating leaching step and a second atmospheric pressure heating leaching step, in which a raw material is heated and leached under an atmospheric pressure to form a leachate solution containing nickel, cobalt, and impurities;
   (B) a first extraction step of separating the leachate solution into a first filtrate containing nickel and impurities and a first organic layer containing cobalt and impurities by adding a first solvent extractant to the leachate solution;
   (C-i) a precipitation removal step of precipitating and removing impurities including magnesium, calcium, or a mixture thereof by adding a precipitating agent to the first filtrate; and
   (D-i) a target material precipitation step of selectively precipitating a nickel cake containing nickel by adding a neutralizing agent to the first filtrate from which the impurities are precipitated and removed.

2. The method of claim 1, wherein a pH of a filtrate obtained in the second atmospheric pressure heating leaching step is lower than a pH of a filtrate obtained in the first atmospheric pressure heating leaching step.

3. The method of claim 1, wherein a filtrate obtained in the second atmospheric pressure heating leaching step is fed to the first atmospheric pressure heating leaching step.

4. The method of claim 1, wherein the first solvent extractant is bis (2,4,4-trimethylpentyl) phosphinic acid.

5. The method of claim 1, wherein the first extraction step is carried out at a temperature of 40 degrees C. and a pH of greater than 5.0 and less than 5.4.

6. The method of claim 1, wherein the precipitating agent is sodium fluoride.

7. The method of claim 1, wherein the precipitating agent is added in an amount of more than 2.0 equivalents and less than 2.4 equivalents of an amount of the magnesium, calcium, or a mixture thereof.

8. The method of claim 1, wherein the neutralizing agent is a basic material containing sodium.

9. The method of claim 1, wherein after the neutralizing agent is added, a pH of the first filtrate is 8 or more at a temperature of 85 degrees C.

10. The method of claim 1, further comprising:
    (E-i) a washing step of washing the nickel cake with pure water.

11. A method for producing an aqueous solution containing nickel or cobalt comprising:
    (A) a leaching step, which includes a first atmospheric pressure heating leaching step and a second atmospheric pressure heating leaching step, in which a raw material is heated and leached under an atmospheric pressure to form a leachate solution containing nickel, cobalt, and impurities;
    (B) a first extraction step of separating the leachate solution into a first filtrate containing nickel and impurities and a first organic layer containing cobalt and impurities by adding a first solvent extractant to the leachate solution; and
    (C-ii) a purification step of removing impurities including magnesium, manganese, zinc, copper, or mixtures thereof by adding a sulfuric acid solution to the first organic layer to produce a second filtrate, and adding sulfide to the second filtrate to precipitate and recover a cobalt precipitate.

12. The method of claim 2, wherein the sulfide is sodium hydrogen sulfide (NaSH).

13. The method of claim 2, wherein the sulfide is added in an amount of more than 1.0 equivalents and less than 1.6 equivalents of an amount of the cobalt and zinc.

14. The method of claim 13, wherein the copper removal step is performed by adding sodium hydrogen sulfide (NaSH) in an amount greater than 4.5 equivalents and less than 5.5 equivalents of an amount of the copper.

15. The method of claim 2, further comprising:
(D-ii) a copper removal step of dissolving the cobalt precipitate in a sulfuric acid solution and then removing copper.

16. The method of claim 15, further comprising:
(E-ii) a second extraction step of separating the copper-removed aqueous solution into a third filtrate containing cobalt and impurities and a second organic layer containing zinc and impurities by adding a second solvent extractant to the copper-removed aqueous solution.

17. The method of claim 16, wherein the second solvent extractant is D2EHPA (di-(2-ethylhexyl) phosphoric acid).

18. The method of claim 16, wherein the second extraction step is carried out at a pH of greater than 2.4 and less than 3.2 at a temperature of 40 degrees C.

19. The method of claim 16, further comprising:
(F) a precipitation removal step of precipitating and removing impurities including magnesium by adding a precipitating agent to the third filtrate.

20. The method of claim 19, further comprising:
(G) a target material precipitation step of selectively precipitating a cobalt cake containing cobalt by adding a neutralizing agent to the third filtrate from which the impurities are precipitated and removed.

21. The method of claim 20, wherein after the neutralizing agent is added, a pH of the third filtrate is 8 or more at a temperature of 85 degrees C.

22. The method of claim 20, further comprising:
(H) a washing step of washing the cobalt cake with pure water.

* * * * *